3,792,045
PROCESS FOR THE PURIFICATION OF LACTAMS
Ruthild Henn, Domat-Ems, Grisons, and Dirk Deiters, Hans-Joachim Schultze, and Clau Berther, Chur, Grisons, Switzerland, assignors to Inventa AG fur Forschung und Patentverwertung, Zurich, Switzerland
No Drawing. Filed Dec. 22, 1971, Ser. No. 211,102
Claims priority, application Switzerland, Jan. 6, 1971, 99/71
Int. Cl. C07d 41/06
U.S. Cl. 260—239.3 A                    14 Claims

ABSTRACT OF THE DISCLOSURE

A process characterized in that raw caprolactam is subjected, in either sequence, to a crystal extraction with an aliphatic or cycloaliphatic hydrocarbon having 5–10 carbon atoms and to distillation under reduced pressure.

---

The present invention is concerned with a simplified process for the purification of lactams, especially of unsubstituted lactams having 6–12 atoms in the ring, and in particular, of caprolactam. Caprolactam, which is made by one of the currently practised proceses, e.g. the classical synthesis through cyclohexane, cyclohexanone, cyclohexanone oxime and the Beckmann transformation thereof, by a photonitrosylation process from cyclohexane, or by nitrosylation of cyclohexane carboxylic acids, is produced, after dilution or neutralization of the mineral acid used and separation of the dilute acid or salt solution by extraction as "extract lactam." The purification of the lactam begins with this extract lactam, which after expulsion of the solvent ordinarily exists as a product containing about 10% of water.

This raw lactam is ordinarily brought to the desired high degree of purity by a combination of physical and chemical methods. Such combined methods may consist e.g. of the fundamental operations distillation and/or crystallization from aqueous solution on the one hand, and treatment with activated charcoal, and/or permanganate, hypochlorite, ion exchangers or catalytic hydrogenation on the other hand. A fundamental disadvantage of all these combinations is the need for auxiliary agents or expenditure of these, as well as the need in part for the regeneration of the auxiliary agents (activated charcoal, ion exchangers) and the cost associated therewith, as well as losses in yield.

An essential simplication and improvement over the combination distillation/melt crystallization is described in Swiss patent application No. 18,932/70 which corresponds to Belgian Pat. No. 776,978, issued on Dec. 20, 1971. In this, no additional auxiliary agents nor chemical treatment is required. The distillation takes place without rectification as a simple top distillation. The working up of the residues which arise in the distillation and the melt crystallization, i.e. on addition of lactam flakes to a melt of the same lactam under practically adiabatic conditions and separation of the resulting lactam crystals, is possible by extractive treatment with suitable solvents. Cyclohexane is particularly recommended as such a solvent.

The extraction of the crystalline caprolactam with cyclohexane or another suitable aliphatic or cycloaliphatic hydrocarbon (e.g. n-hexane, methylcyclohexane, etc.) is distinguished by an outstanding selective solubility of the lactam impurities in the hydrocarbon, with a lower solubility of the lactam itself. This effect is particularly marked at room temperature.

A further important simplification arises if a simple top distillation is combined with a crystal extraction and, as starting material, extract lactam or an analogous raw lactam is used. The subject of the present invention is therefore the production of pure lactam, especially of unsubstituted lactams having 6–12 carbon atoms in the ring, and in particular caprolactam, from extract lactam or another raw lactam by combined treatment of distillation under reduced pressure and crystalline extraction of the lactam with an aliphatic or cycloaliphatic hydrocarbon having 5–10 carbon atoms, particularly with cyclohexane or petroleum ether. It is of no significance whether the raw lactam is first distilled and then extracted in the crystalline state, or vice versa. The purification effect is unexpectedly equally good and the selection of the sequence of operations need only be suited to technical requirements. The process may advantageously be carried out continuously.

This simple combination of two purification stages has the following advantages over existing purification processes:

It avoids complicated multi-stage distillation and rectification plant, requires no additional physical purification treatment, e.g. crystallization from melts or aqueous solution which make considerable demands of measurement and regulation, it avoids the discontinuous or partially continuous use of chemical adjuvants like activated charcoal, ion exchangers, permanganate, etc. and is therefore cheaper, more certain in operation and technically simple and available for continuous operation.

The success of this process, particular in the case of crystal extraction followed by distillation, was unexpected since normally multi-stage distillation gives only an insignificant improvement in the qualtity of the lactam particularly with reference to the volatile bases value. Since, on the other hand, extraction of the lactam crystals, e.g. with cyclohexane starting from extract lactam, gives only an apparently small purifying effect, it was not to be foreseen that on distillation this pretreated lactam would behave quite differently.

These facts will become apparent from the following comparative table:

| | Volatile bases | Permanganate number |
|---|---|---|
| Extract caprolactam: | | |
| Untreated | 0.30 | 200 |
| Distilled | 0.18 | 2,000 |
| Twice distilled | 0.15 | 3,000 |
| Crystal extracted | 0.20 | 850 |
| Crystal extracted and distilled | 0.03 | >20,000 |

Whilst thus the re-distillation of a lactam which has not been subjected to crystal extraction gives only improvements in volatile base values of about 0.03, and in permanganate number of about 1000, the simple distillation of a product previously crystal-extracted from the same extract lactam improves the analysis values significantly. In the volatile bases value an improvement of 0.17 and in permanganate number of more than 20,000 can be obtained.

The reason this is possible is that, in the extraction, certain impurities are removed which normally react under the conditions of the lactam distillation with themselves or other components to form compounds which are difficult to remove by distillation, and in this form can only be removed by crystal extraction.

As previously stated, in order for the total purification effect to be obtained, the sequence in which the two stages, distillation and crystal extraction, are carried out is unimportant. For convenience, the process of the invention will be more fully described with reference to the variant crystal extraction followed by distillation. This form has a technical advantage over the other one only in that no special drying device is required for the removal of the extractant adhering to the lactam, since this drying can be combined with the lactam distillation.

Extract lactam freed from water and/or solvent, i.e. raw lactam, is introduced in flakes or preferably in molten form, i.e. in the case of caprolactam at a temperature of 70–80° C., while stirring well and cooling, into an aliphatic or cycloaliphatic hydrocarbon having 5–10 carbon atoms (e.g. n- or i-hexane and its straight chain or branched chain homologues, methyl or higher alkylated cyclohexane, Decalin and especially petroleum ether having a boiling point range of 110–140° C.). The advantage of petroleum ether is that it is cheap and has a low solvent power for e.g. caprolactam. Preferably cyclohexane is used, which is used e.g. in many caprolactam processes as starting material, and which is therefore already available. The ratio of lactam:extractant is 1:1 to 1:6, preferably, 1:1.5 to 1:2.5. The upper limit of the quantity of solvent is chosen according to the purity of the lactam introduced and economic considerations. The temperature of the cyclohexane-lactam mixture is maintained at 10–40° C., preferably 10–25° C. With higher temperatures the purification effect is impaired, moreover the solubility of the lactam in cyclohexane increases. At 20° C. the solubility of caprolactam in cyclohexane amounts to 1.38 g. per 100 ml. of solution. The extraction time may be between 5 and 60 minutes. Longer times confer no advantage, the preferred extraction time, e.g. for caprolactam, is between 10 and 30 minutes, and e.g. for laurolactam between 30 and 60 minutes. With the use of petroleum ether for the crystal extraction substantially the same conditions hold for temperature, extraction times, and quantitative ratio as with the use of cyclohexane.

The lactam in the melt precipitates immediately, on contact with the cold solvent or solvent-lactam mixture, in solid form and forms a finely crystalline slurry therewith. The separation of this crystal slurry into solvent and lactam may take place by filtration, preferably however decanting centrifuges are used since their separating action is better than that of filters. The solvent separated after centrifuging contains according to the ratio of lactam:solvent and the temperature maintained during extraction, e.g. caprolactam in the region of 1–3%, and e.g. laurolactam in the region of 0.5–1%, as well as the extracted impurities. Since these impurities are greatly enriched, calculated on the basis of the quantity of dissolved lactam, and the lactam quantity is small, working up the extract with the object of recovering the lactam is normally dispensed with. The working up of the solvent may take place by simple distillation or by washing with water. Thereafter, the solvent can be recycled to the crystal extraction stage.

The caprolactam coming from the centrifuge contains, according to the crystal size and the efficiency of the centrifuge, in the region of 3–10% of its weight as solvent. The lactam may be treated with steam whereby the solvent is evaporated and after condensation may likewise be recycled to the extraction stage.

For caprolactam e.g. the conditions are so arranged that, after removal of the cyclohexane, the lactam is present in the form of a melt containing about 10% of water which, after addition of sodium hydroxide, preferably 0.05–0.5% by weight, is directly subjected to distillation under reduced pressure. The first fraction containing water and only a little lactam is rejected. The main fraction, consisting of lactam, forms the end product of the purification process. A small portion of fore-runnings of this main fraction containing predominantly lactam with a little water as well as the distillation residue, both together being about 4–7% of the product introduced into the distillation can be exhaustively extracted in the form of a 50% aqueous solution with benzene or toluene, and the lactam recovered thereby be added to the product subjected to the distillation. The yield of caprolactam from this residue extraction amounts to 90–95%. In this way a total yield of about 99% is obtained.

The distillation of laurolactam may be performed in an analogous manner. The presence of sodium hydroxide is not necessary.

The process for the purification of lactams in accordance with the present invention is thus characterized in that the raw lactam is subjected in either sequence to a crystal extraction with an aliphatic or cycloaliphatic hydrocarbon having 5–10 carbon atoms and to distillation under reduced pressure.

The following examples illustrate the essence of the invention in more detail without limiting this in any way.

EXAMPLE 1

1,000 kg. of an extract caprolactam coming from the solvent distillation or raw caprolactam (permanganate number 200, volatile bases 0.32, APHA number 40% solution 70–80, transparency at 290 and 310 nm.=21.5 and 47.0%) consisting of 936.5 kg. of fresh product and 63.5 kg. of product resulting from the working up of the distillation fore-runnings and distillation residue, free from water and organic solvents are fed together with 2,000 l. of cyclohexane with stirring and cooling such that the temperature of the mixture does not exceed 15° C. Then this slurry of lactam crystals and cyclohexane which forms is stirred to ensure an average retention time of the product in the stirring vessel of 30 minutes. After this, the lactam crystals are separated from the cyclohexane by means of a decanting centrifuge. The yield amounts to 1029 kg. of damp product with a residual content of 4.47% by weight of cyclohexane, i.e., 983 kg. of lactam (permanganate number 950, volatile base 0.24, APHA number 40% solution 50–60, transparency at 290 and 310 nm.=31.0 and 48.0%).

This product is treated in a dissolving container with a quantity of steam sufficient so that a lactam melt containing about 10% of water is formed and the residual cyclohexane liberated from the lactam. By condensation of this liberated cyclohexane, 45.5 kg. are recovered, and this together with the cyclohexane coming from the centrifuge and containing the impurities and dissolved lactam is intensively mixed with 1,000 kg. of water. The temperature of the mixture amounts to 12° C., the contact time is two minutes. Then the two phases are separated in a settling vessel, the aqueous solution which contains about 16 kg. of lactam is rejected and the cyclohexane recycled to the crystal extraction.

The lactam containing about 10% water is treated with 1.75 kg. of sodium hydroxide and then subjected to a simple distillation under reduced pressure, at first under 20 mm. of Hg, and then at 1 mm. Hg 100 l. of aqueous distillate containing 1.3 kg. of lactam is rejected.

There are formed 43 kg. of lactam fore-runnings containing water, 914 kg. of main fraction and 37 kg. of distillation residue. The main fraction consists of the pure lactam, the yield calculated on the extract lactam (fresh material) amounts to 97%. The analysis values are as follows: Permanganate number >20,000, volatile bases 0.03–0.05, APHA, 40% aqueous solution=0, trans-parency at 290 and 310 nm.>94.5 and 97.5% respectively.

The aqueous fore-runnings product together with the distillation residue are together, in the form of 50% aqueous solution, exhaustively extracted with benzene. By this means, 63 kg. representing 92% of the lactam contained in the fore-runnings and distillation residue are recover. This product is recycled in the form of a solution in benzene into the solvent distillation, and thus into the main product stream.

EXAMPLE 2

1,000 kg. of an extract lactam composed as described in Example 1 are treated whilst reversing the order of the purification stages, that is to say, initial distillation and subsequent crystal extraction of the distillate under otherwise completely analogous conditions (temperature, quantitative proportions, retention times). The recovery of the cyclohexane which adheres to the lactam coming from the crystal extraction takes place in this case by melting the product in a nitrogen atmosphere.

With this variant, 916.5 kg. of pure lactam are obtained corresponding to a yield of 98% calculated on the extract lactam (fresh product) with the following analysis values: Permanganate number >20,000, volatile bases 0.03–0.04, APHA 40% aqueous solution=0, transparency at 290 and 310 nm.=96.0 and 98.5%.

EXAMPLE 3

1,000 kg. of a raw laurolactam coming from a solvent distillation are distilled at 3–4 torr. The lactam obtained shows the following analysis data: volatile bases 0.06, ketone content 183 p.p.m.

The molten distillate (960 kg., temp. of the melt: 170° C.) is entered with good stirring and cooling into 4900 l. of petroleum ether (boiling point 110–140° C.), whereby the temperature of the mixture is held at 20–26° C.

After stirring for 30 minutes, the solvent is separated by means of a decanting centrifuge and the product obtained, which contains petroleum ether, is dried. There are obtained 959 kg. of pure laurolactam (volatile bases 0.02 and ketone content 125 p.p.m.).

What is claimed is:

1. In a process for the purification of an impure unsubstituted lactam having 6–12 carbon atoms in its ring the improvement which comprises subjecting said lactam to crystal extraction for from 5 to 60 minutes with an extracting agent selected from the group consisting of aliphatic hydrocarbons having 5–10 carbon atoms and cycloaliphatic hydrocarbons having 5–10 carbon atoms; the lactam and the extracting agent being employed in a ratio of at least 1:1 respectively, said ratio being parts by weight to parts by volume; and distilling said lactam.

2. The process as recited in claim 1 wherein the distillation is under reduced pressure.

3. The process as recited in claim 1 wherein the lactam is caprolactam.

4. The process as recited in claim 1 wherein the extraction is effected at a ratio of lactam to extracting agent of 1:1 to 1:6.

5. The process as recited in claim 1 wherein the extraction is effected at a ratio of lactam to extractant of 1:1.5 to 1:2.5.

6. The process as recited in claim 1 wherein the extracting agent is cyclohexane or petroleum ether.

7. The process as recited in claim 1 wherein the extraction is carried out at about 10–40° C.

8. The process as recited in claim 1 wherein the extraction is carried out at 10–25° C.

9. The process as recited in claim 1 wherein the lactam is introduced in molten form into said extracting agent.

10. The process as recited in claim 1 wherein the distillation is carried out in the presence of sodium hydroxide.

11. The process as recited in claim 10 wherein the sodium hydroxide is present in an amount of 0.05–0.5% by weight.

12. The process as recited in claim 1 wherein the purification process is continuous.

13. The process as recited in claim 12 wherein the extracting agent is recovered by distillation or by washing with water and recycled to the crystal extraction.

14. The process as recited in claim 12 wherein lactam contained in an aqueous solution of fore-runnings of a main fraction and residue, each produced in said distillation step, is extracted with benzene or toluene then recycled to the starting point of the process.

References Cited

UNITED STATES PATENTS 2,758,991    8/1956    Kretzers et al. ____ 260—239.3 A

HENRY R. JILES, Primary Examiner

R. T. BOND, Assistant Examiner

U.S. Cl. X.R.

260—293.86